United States Patent
Reed

[15] 3,661,534
[45] May 9, 1972

[54] APPARATUS FOR SULFUR RECOVERY

[72] Inventor: Robert D. Reed, Tulsa, Okla.

[73] Assignee: John Zink Company, Tulsa, Okla.

[22] Filed: June 15, 1970

[21] Appl. No.: 45,968

[52] U.S. Cl..............................23/262, 23/225 P, 431/187
[51] Int. Cl. ......................................................C01b 17/04
[58] Field of Search..............23/262, 277, 225 P, 278, 259.5;
431/353, 187, 188, 5; 263/19 A

[56] References Cited

UNITED STATES PATENTS 3,079,236   2/1963   Heller et al. ..........................23/209.4
2,981,320   4/1961   Reed......................................431/188

FOREIGN PATENTS OR APPLICATIONS 858,939   1/1961   Great Britain..........................23/278

Primary Examiner—James H. Tayman, Jr.
Attorney—Clelle W. Upchurch

[57] ABSTRACT

Apparatus is provided for burning sulfur which combines a jacketed pipe and a nozzle for spraying sulfur at a controlled temperature in a first chamber, a second chamber where the sulfur is burned downstream from the nozzle and a third chamber where the combustion product is mixed with acid gas to provide a mixture of gases suitable for transfer to a Claus reactor.

3 Claims, 3 Drawing Figures

INVENTOR
ROBERT D. REED

BY
ATTORNEY

APPARATUS FOR SULFUR RECOVERY

This invention relates generally to the production of sulfur and more particularly to an improved method and apparatus for recovering free or elemental sulfur from acid gases containing hydrogen sulfide.

Elemental sulfur is usually recovered from acid gases containing hydrogen sulfide by first absorbing the hydrogen sulfide and carbon dioxide in an aqueous solution of an alkaline material such as monoethanolamine or diethanolamine, stripping the hydrogen sulfide from the solution and treating it in a conventional Claus recovery plant. In the Claus process about one-third of the hydrogen sulfide is burned with air to form sulfur dioxide and water and to provide a mixture of about one mol sulfur dioxide per two mols hydrogen sulfide. The sulfur dioxide and hydrogen sulfide are reacted over a catalyst in a Claus reactor to produce elemental sulfur and water vapor in accordance with the equation:

$$SO_2 + 2H_2S = 3S + 2H_2O$$

The sulfur vapor is then recovered by condensation in a tubular condenser or is circulated through a sulfur scrubber where it is contacted with a stream of liquid sulfur.

The Claus process can be used to advantage when the acid gas contains more than 10 percent hydrogen sulfide but it is not suitable for recovering sulfur from gases containing ten percent or less hydrogen sulfide because of the difficulty experienced in burning one-third of the hydrogen sulfide. It has been proposed to recover sulfur from gases containing less than 10 percent hydrogen sulfide by burning liquid sulfur in air to produce the sulfur dioxide used in the Claus recovery process. Such a process has not been entirely successful because of the loss of hydrogen sulfide through oxidation by air in the combustion products. In addition the apparatus provided for carrying out the process requires a boiler for separation of the sulfur dioxide product from water vapor.

It is accordingly an object of the present invention to provide an improved process for preparing a mixture of sulfur dioxide and acid gas in a ratio of 1 mol sulfur dioxide per 2 mols hydrogen sulfide in the acid gas. Another object of the invention is to provide apparatus for preparing sulfur dioxide and for mixing it with acid gases containing hydrogen sulfide in proportions suitable for chemical reaction in a conventional Claus reactor to form free sulfur and water vapor. A still further object of this invention is to provide apparatus and a process for proper and economical preparation of a mixture of 1 mol sulfur dioxide per 2 mols hydrogen sulfide in acid gases containing as little as about 1 percent hydrogen sulfide.

Other objects of the invention will be appreciated and become apparent from consideration of the following description taken with the accompanying drawings in which.

The invention pertains to apparatus and a process for burning molten sulfur with its stoichiometric equivalent of oxygen, mixing the resulting sulfur dioxide substantially free from oxygen with an acid gas containing hydrogen sulfide in a ratio which provides about 1 mol sulfur dioxide per 2 mols hydrogen sulfide in the mixture and charging the resulting mixture to a conventional Claus or similar reactor where the sulfur dioxide and hydrogen react in accordance with the foregoing equation. The apparatus and process embodying the invention can be used to advantage for recovering sulfur from acid gases containing about 10 percent or less by weight hydrogen sulfide but they can also be employed to recover sulfur from gases containing larger quantities of hydrogen sulfide. While the process and apparatus are adapted to the recovery of sulfur from gases containing even less than 1 percent hydrogen sulfide, it is not always economically advantageous to use such gases unless it is desired to avoid air pollution problems. In accordance with one embodiment of this invention sulfur is heated to about 300°±5° Fahrenheit, atomized as a substantially conical spray into an atmosphere containing oxygen in an amount stoichiometrically equivalent to the sulfur, and burned at a temperature maintained below 3,000° Fahrenheit to form sulfur dioxide. The resulting combustion product is mixed substantially uniformly with acid gas containing hydrogen sulfide in a ratio which provides about 1 mol sulfur dioxide per 2 mols hydrogen sulfide in the resulting mixture and the temperature of the mixture is adjusted by heating it to the point required for reaction of substantially all of the sulfur dioxide with hydrogen sulfide. The gaseous product is then flowed into a conventional reactor such as a Claus catalytic reactor where the sulfur dioxide and hydrogen sulfide react to form sulfur and water vapor. In a preferred embodiment a minor portion of the acid gas charged to the apparatus is introduced into the area where the sulfur is burned to cool the combustion products and maintain the temperature below the point where refractory material used to construct the apparatus would be destroyed under the reducing conditions prevailing at this zone in the apparatus.

Figure 1:
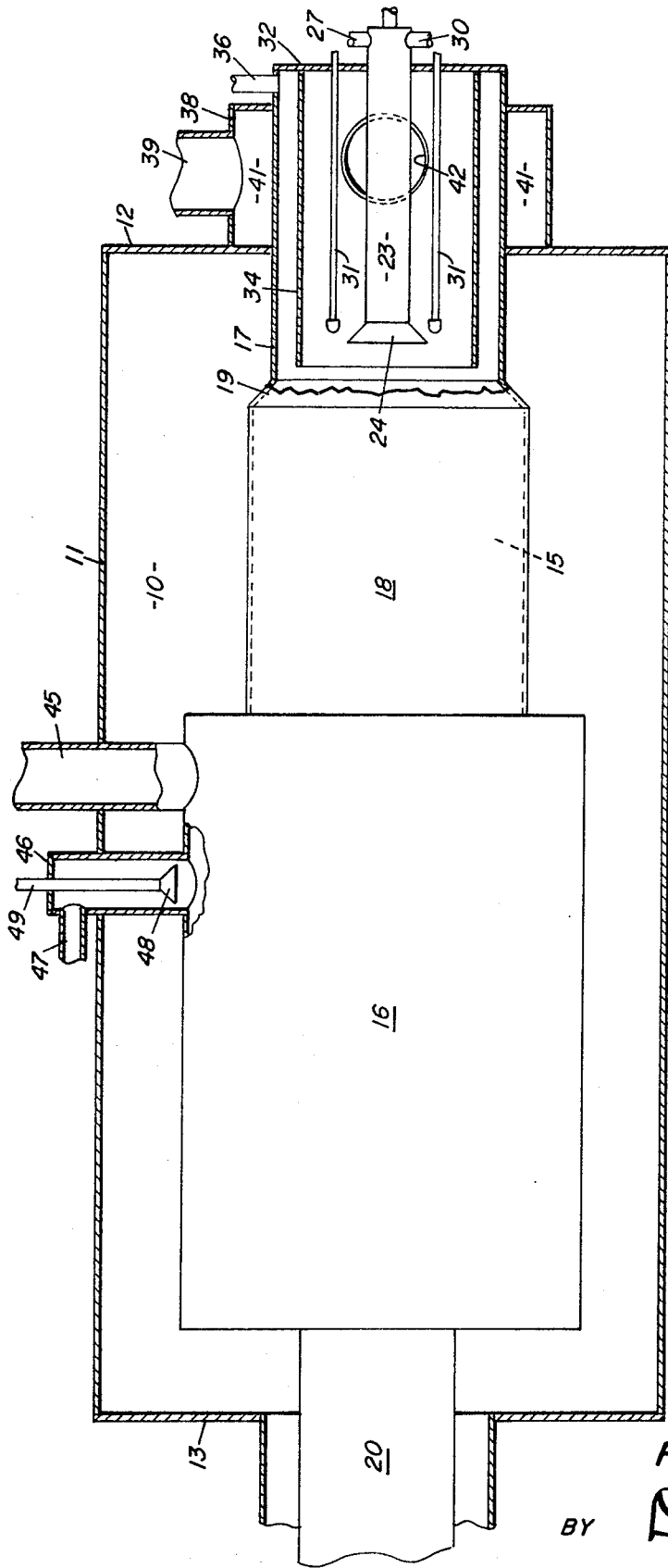
FIG. 1 is a longitudinal sectional view of one embodiment of apparatus embodying invention.

Referring now to FIG. 1 of the drawing, a substantially cylindrical housing 11 and end walls 12 and 13 combine to form a chamber 10. A tubular member 17 encloses a chamber 14 and this tubular member extends outside the housing 11 through the end wall 12. A tube 18 of larger cross-section than the tubular member 17 encloses a chamber 15. The adjacent ends of the tubular member 17 and the tube 18 are joined by frusto-conically shaped section 19. The other end of tube 18 is welded or otherwise joined to an adjacent end of a cylindrical shaped casing 16 which is of greater cross-section than the tube 18. A conduit 20 serves as an exit for gases flowing from the casing 16 and connects the apparatus with a conventional Claus type convertor or reactor where the hydrogen sulfide and sulfur dioxide mixture provided by this invention are reacted over a catalyst to form free sulfur.

Figure 2:
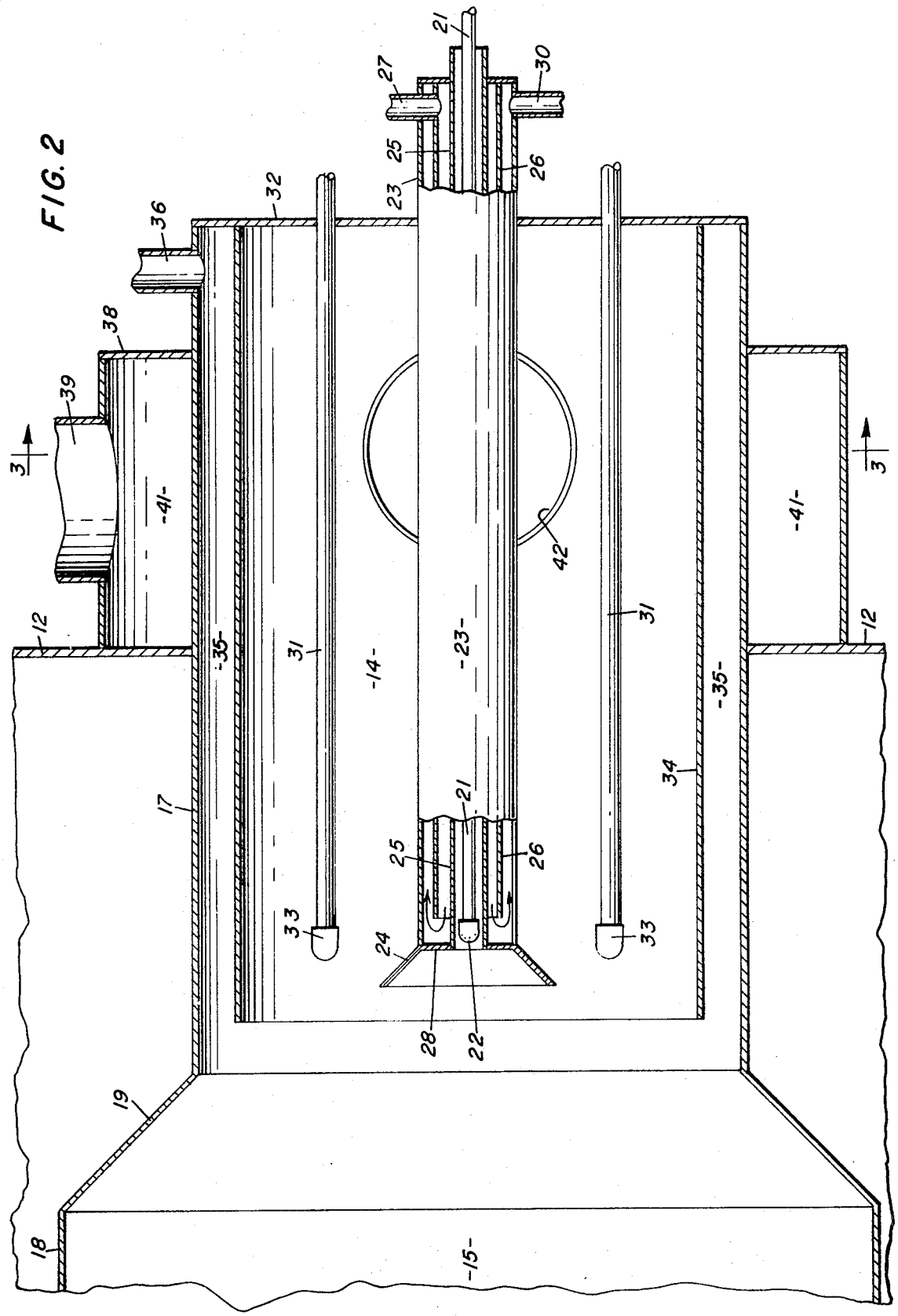
FIG. 2 is a longitudinal sectional view of a portion of apparatus shown in FIG. 1 and on a larger scale.
Figure 3:
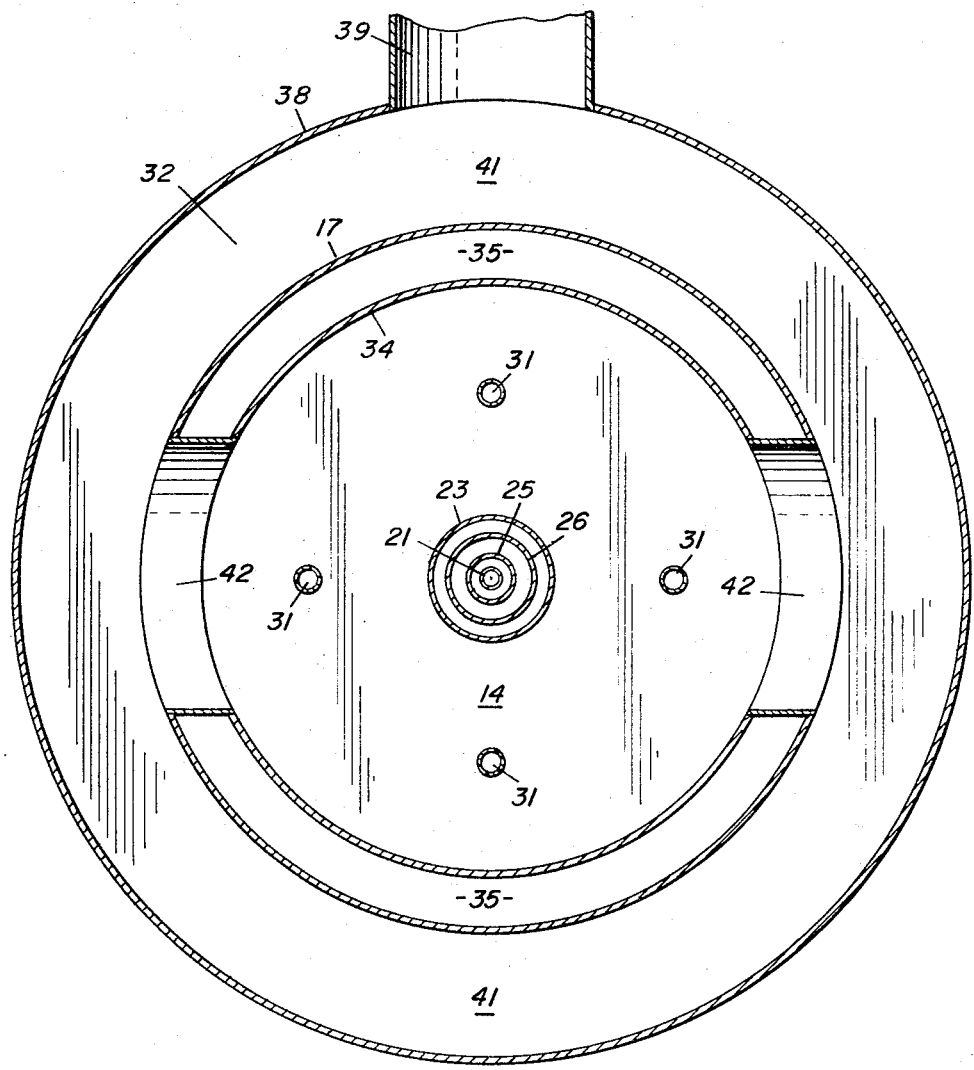
FIG. 3 is a sectional view taken along the line 3—3 of FIG. 2.

As illustrated best in FIG. 2, a pipe 21 extends from a source of liquid sulfur and is equipped within chamber 14 with a spray nozzle 22. A tubular member 23 embraces the pipe 21 and encloses it throughout its length within chamber 14. A frusto-conically shaped element 24 is secured to the end of the tubular member 23. A tube 25 of smaller diameter than the tubular member 23 is disposed therein to provide an annular space therebetween. A pipe 26 is arranged between the tubular member 23 and the tube 25. An annular plate 28 at the downstream end of the tube 25 closes the annular area between the tubular member 23 and the tube 25. The pipe 26 terminates in spaced relationship to the annular plate 28 as best shown in FIG. 2. A similar annular plate closes the upstream end of the tube 25 with respect to the tubular member 23. An inlet pipe 27 serves to guide steam into the annular space between the pipe 26 and the tube 25. The steam passes around the end of the pipe 26 and enters the annular space between the tubular member 23 and the pipe 26. The steam from this jacket assembly is removed through an outlet pipe 30.

A plurality of conduits 31 extend through end wall 32 and these conduits are circumferentially spaced about the tubular member 23. The conduits 31 terminate near frusto-conically shaped element 24 and each conduit is equipped with a burner tip 33. A gaseous fuel mixture is supplied to the conduits 31.

A substantially cylindrical shaped partition 34 within the tubular member 17 surrounds the conduits 31, and is of such diameter as to form an annular space 35 between the tubular member 17 and the partition 34. A pipe 36 for guiding an acid gas into the annular space 35 is attached to the tubular member 17. The partition 34 terminates within the chamber 14. An annular casing 38 is disposed about the periphery of the tubular member 17. An inlet opening 39 admits air to the annular space 41 within the casing 38. Ducts 42 permit air to flow from space 41 into the chamber 14.

An inlet duct 45 extends through the housing 11 as shown in FIG. 1 and guides an acid gas into the casing 16. A tubular fitting 46 extends through the housing 11 into communication with the casing 16. Air is admitted to the fitting 46 through a tube 47. A gas burner 48 is mounted within the fitting 46. Gaseous fuel is supplied to the burner 48 through a pipe 49. The conduit 20 extends from the casing 16 to a catalytic converter of the conventional Claus type or any other suitable reactor where the hydrogen sulfide and sulfur dioxide are reacted together to form free sulfur.

In carrying out the method a supply of molten sulfur is provided through pipe 21 to the nozzle 22. In order to provide a spray which can be burned completely with only its stoichiometric equivalence of oxygen, the temperature of the sulfur at the nozzle 22 must be from about 295° to about 305° Fahrenheit. As the sulfur is heated above its melting point at 248° to about 300° Fahrenheit, its viscosity rapidly decreases from above 1,000 centipoises to about 7.1 centipoises. Further increase in temperature results in increased viscosity. At 320° Fahrenheit the viscosity of sulfur is about 77.3 centipoises and at 329° Fahrenheit the viscosity has increased to about 500 centipoises. The viscosity of sulfur should be not above about 20 centipoises for suitable spraying so it is important that the temperature of the sulfur at the nozzle 22 be within the above specified limits of 300° ± 5° Fahrenheit.

The temperature of the sulfur is controlled within the required limits with steam in jacket assembly which surrounds the pipe 21 and the nozzle 22. Steam enters at about 300° Fahrenheit through the tube 27 out of the jacket assembly through the tube 30. This circulation of steam at 300° Fahrenheit through jacket assembly prevents loss of heat from or transfer of heat to the liquid sulfur as it passes through pipe 21. The frustro-conical shaped element 24 insures the issuance of a conical spray for optimum burning of the sulfur.

In order that only a stoichiometric amount of oxygen is available for burning the sulfur spray, air flow into the chamber 14 is controlled. The controlled quantity of air is supplied through the inlet 39 to the annular space 41 and into the chamber 14 through ducts 42. Flow of air into the space 41 creates a pressure therein which is greater than the pressure in the chamber 14. Because of the greater pressure in the space 41, air flows through the two ducts 42 into the chamber 14 and then in a downstream direction through the chamber 14 to supply air for burning the sulfur spray issuing from the nozzle 22. Air thus delivered flows uniformly throughout the cross-sectional area of the chamber 14.

In the burning of sulfur, heat is released at a rate of about 4,000 BTU per pound sulfur burned. When sulfur is burned with its stoichiometric equivalence of oxygen a temperature in the order of about 3,000° Fahrenheit is produced. In a reducing atmosphere of the type prevailing in the apparatus at 3,000° Fahrenheit, typical refractory materials are destroyed so means is provided for cooling chamber 14. This cooling is achieved by introducing acid-gas through the pipe 36 into the annular space 35. The acid gas flows downstream through the annular space 35 beyond the open end of partition 34 and becomes mixed with the gaseous combustion products from the burning of the sulfur spray. About 10 percent of the total acid gas to be passed through apparatus is sufficient to maintain a temperature in chamber 14 below the point where appreciable destruction of the chamber walls will occur. Any other suitable cooling such as a water spray or a water jacket may be used but the use of acid-gas does not introduce any process disadvantage nor any added cost.

The main portion of the acid gas to have its hydrogen sulfide converted to sulfur is introduced into chamber 15 through the duct 45. This stream of acid gas is introduced into the stream of gases flowing from the chamber 15 at about a 90° angle to the longitudinal axis of casing 16. The gases are flowing from chamber 15 to casing 16 at a relatively low velocity and probably at as low as 30 feet per second whereas the acid gas because of pressure drop immediately at entry into casing 16 through 45 is flowing at a velocity of about 200 feet per second. The combination of differential velocity and the addition of the acid gas to the gas stream from chamber 15 at an acute angle produces turbulence and increased residence time in casing 16 to insure substantially uniform mixing of the two gas streams together.

The temperature of the gas mixture containing 1 mol sulfur dioxide per 2 mols hydrogen sulfide is adjusted to about 465° Fahrenheit before it passes from casing 16 into a Claus catalytic reactor. This is achieved by heating the gaseous mixture with a fuel burner 48. The burner 48 discharges its gaseous products and heat into the casing 16. Any suitable fuel may be burned but the quantity of fuel burned is controlled so that the temperature of the gas flowing through conduit 20 is about 465° Fahrenheit. The fuel is burned with its stoichiometric equivalence of oxygen by controlling the volume of air flowing through conduit 47 to avoid delivery of oxygen to casing 16.

The acid gas charged through conduit 45 is metered into casing 16 in a volume which when combined with the acid gas charged to chamber 14 supplies 2 mols hydrogen sulfide per mol of sulfur dioxide in the gas stream leaving through conduit 20. While the optimum gas temperature for a Claus reactor is about 465° Fahrenheit some variation can be tolerated but best results are obtained within the range of from about 450° Fahrenheit to about 475° Fahrenheit. By proper control of volume of fuel gas burned by burner 48 the temperature of the gas in casing 16 is easily controlled within this range. Any suitable catalytic reactor known in the art can be used to react the sulfur dioxide and hydrogen sulfide in the gas leaving casing 16 through conduit 20.

Although the invention has been described in detail for the purpose of illustration such disclosure is solely for that purpose and it is to be understood that variations may be made by those skilled in the art without departing from the spirit and scope of the invention except as it may be limited by the claims.

What is claimed and desired to be secured by Letters Patent is:

1. Apparatus for preparing a substantially uniform mixture of sulfur dioxide and acid gas containing hydrogen sulfide in a molar ratio of about 1 mol sulfur dioxide per 2 mols hydrogen sulfide which comprises, means for atomizing molten sulfur including a pipe connected at one end to a supply of molten sulfur and terminating at its other end in a spray nozzle, means providing a jacket assembly about said pipe, means for circulating steam through the jacket assembly, an annular partition spaced outwardly from said jacket assembly providing an annular space between the partition and the jacket assembly, said partition having an open end about the spray nozzle, a fuel burner adjacent the spray nozzle, a tubular member disposed concentrically about and spaced outwardly from said partition with an annular space therebetween and having a downstream end, a tube disposed longitudinally downstream from the nozzle and having its axis aligned with the axis of said tubular member and joined at its upstream end to the downstream end of the tubular member, a casing having its longitudinal axis aligned with said tube and secured at its upstream end to the downstream end of said tube, means disposed downstream of the said tube for introducing measured amounts of acid gas into said casing, means downstream of said tubular member for heating gas as it flows through said casing, and means for guiding gas from said casing.

2. The apparatus of claim 1 wherein a plurality of circumferentially spaced fuel gas burners are disposed adjacent the spray nozzle.

3. The apparatus of claim 1 wherein the means for supplying heat to the said casing is a fuel gas burner which discharges its combustion products into the casing.

* * * * *